United States Patent [19]
Simmons

[11] 3,746,038
[45] July 17, 1973

[54] FUEL HEAD COMPENSATING VALVE FOR FUEL INJECTION NOZZLE

[75] Inventor: Harold C. Simmons, Richmond Heights, Ohio

[73] Assignee: Parker-Hannifin Corporation, Cleveland, Ohio

[22] Filed: Jan. 25, 1971

[21] Appl. No.: 109,113

[52] U.S. Cl............ 137/513.5, 137/514, 137/539.5, 239/551
[51] Int. Cl............................................. F16k 15/04
[58] Field of Search............. 137/514, 514.5, 514.7, 137/519.5, 535, 538, 539, 539.5, 513.5, 543.17, 543.19

[56] References Cited
UNITED STATES PATENTS

| 1,243,454 | 10/1917 | Spaleck | 137/519.5 X |
| 3,465,787 | 9/1969 | Gulick | 137/539.5 |
| 1,775,964 | 9/1930 | Middendorf | 137/513.5 X |
| 2,541,395 | 2/1951 | Wilson | 137/514.5 |
| 2,632,458 | 3/1953 | Slomer | 137/539.5 X |
| 2,714,392 | 8/1955 | Mercier | 137/514.7 |
| 3,550,617 | 12/1970 | Johnson | 137/514.5 |

FOREIGN PATENTS OR APPLICATIONS

| 777,829 | 12/1934 | France | 137/539.5 |
| 487,756 | 6/1938 | Great Britain | 137/539 |

Primary Examiner—Martin P. Schwadron
Assistant Examiner—David J. Zobkiw
Attorney—Oberlin, Maky, Donnelly & Renner

[57] ABSTRACT

Flow metering valves for use in conjunction with fuel sprayer nozzles mounted on vertical ring manifolds characterized in that the valves compensate for difference in fuel head around the manifold by equating the effects of the masses of the valve operating parts according to the angular positions of the respective valves around the manifold thereby compensating for the differences in fuel head with reference to a datum pressure in a horizontal plane passing through the center of the manifold. The valves herein are further characterized in that the movable valve parts whose masses balance fuel head differences around the fuel manifold comprise a plurality of balls to minimize sliding friction, one of the balls of each valve constituting a metering valve member which moves in the valve to vary the area of a metering slot therein, said ball being thus moved by fuel pressure while in contact with another ball which is spring actuated tending to decrease the area of the metering slot.

2 Claims, 4 Drawing Figures

PATENTED JUL 17 1973  3,746,038

INVENTOR.
HAROLD C. SIMMONS
BY
Oberlin, Maky, Donnelly & Renner
ATTORNEYS 3,746,038

FUEL HEAD COMPENSATING VALVE FOR FUEL INJECTION NOZZLE

BACKGROUND OF THE INVENTION

A fuel manifold for a gas turbine and the like generally is of ring-shaped configuration with its axis coinciding with the engine axis and has radially or axially extending fuel sprayer nozzles circumferentially spaced therearound to direct fuel in finely divided conical spray form into the annular combustion chamber of the engine. As evident, with a fuel pressure P at the nozzles located at the opposite sides of a manifold of diameter $h$, the fuel pressure to which the nozzles around the manifold will be $P \pm h/2 \sin \phi$ where $\phi$ is the angular disposition of the nozzle below or above the horizontal center line of the manifold. Accordingly, due to the physical size of some manifolds, the maximum head difference $h$ may be as much as 1.5 psi. In the case of nozzles having, for example, a minimum operating fuel pressure of 50 psi, the effect of such head difference is sufficiently small that it may be neglected. However, there are cases in which the main metering pressure P may be less than 1 psi; therefore, under these conditions the head difference may become significant in that fuel will tend to flow from the nozzles at the bottom of the engine only.

Under these conditions it is common practice to interpose between the manifold and each fuel nozzle a valve which has as its purpose in combination with the fuel nozzle to require a higher fuel pressure drop for metering a given quantity of fuel than the nozzle alone. In this way, by choice of suitable valve characteristics the head differences may be minimized. However, it is not always practicable or desirable to employ a sufficiently high pressure drop across the valve to reduce the head difference to sufficiently low proportions.

SUMMARY OF THE INVENTION

The present invention is concerned with a flow metering valve which solves the aforesaid head difference problem without requiring an unduly large pressure drop. The fuel head compensating valve herein has the mass of its operating parts related to the head differences around the manifold so as to have a compensating or balancing effect regardless of the angular position in which the valve is mounted on the manifold. By so compensating for the differences in fuel head around the manifold, all of the valves may be preset to unseat at the same fluid pressure, whereby it is immaterial that the valves may be exposed to different pressures when installed around the manifold.

Stated in other words, the mass of the movable valve operating parts is selected so that the force component thereof in the direction of seating or unseating of the valve member is substantially equal to the fuel head at different portions of the manifold multiplied by the valve seat area. This force component tends to unseat the valve member when the valve is mounted on the manifold in a position above the horizontal center line and tends to seat the valve member when the valve is installed in a position below the horizontal center line, whereby the decreased or increased head relative to the datum pressure at the horizontal center line is substantially balanced or compensated for so that the valve movements to metering positions are under the influence of the nominal or datum fuel pressure.

Other objects and advantages of the present invention will appear hereinafter.

DETAILED DESCRIPTION OF THE INVENTION

Figure 1:
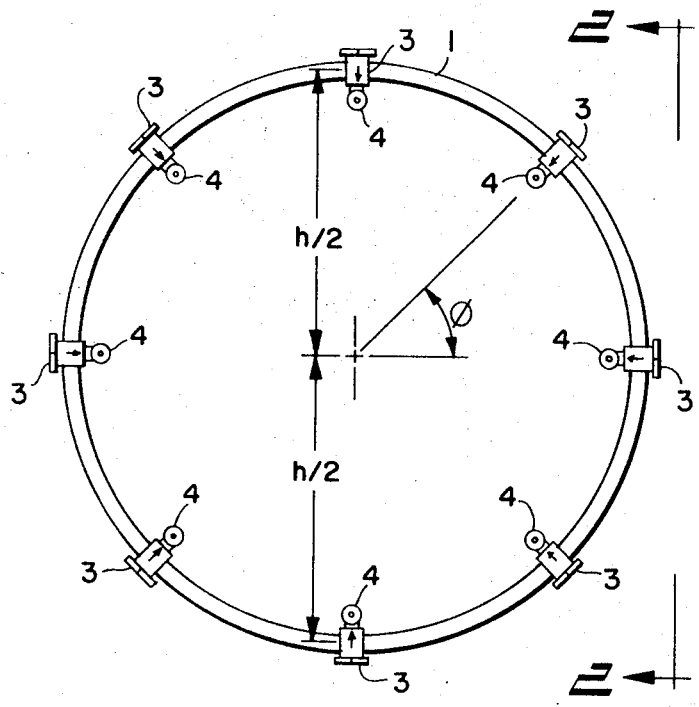
FIG. 1 is a schematic illustration of a ring manifold having a series of metering valves and spray nozzles disposed in circumferentially spaced relation therearound.
Figure 2:
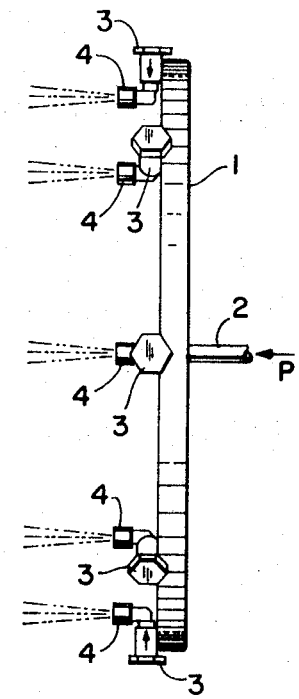
FIG. 2 is an elevation view as viewed from the right-hand side of FIG. 1.

In FIGS. 1 and 2 the reference numeral 1 denotes a circular ring manifold having fuel feed lines 2 connected thereto at opposite sides to which fuel is supplied at desired pressure P from fuel pumps (not shown). Connected to the manifold 1 at circumferentially spaced apart points therearound are a series of flow metering valves 3 (or flow fuel head compensating valves) in which the valve operating parts move radially in the directions indicated by the arrows to meter the flow of fuel therethrough to the respective fuel sprayer nozzles 4 which, as well known in the art, are operative to divide the fuel into small particles as in the form of hollow spray cones into the combustion chamber of the gas turbine or the like. Ordinarily, the combustion chamber will be of annular form coaxial with the engine axis.

As shown, the manifold 1 will generally be disposed in a vertical plane coaxial with the engine and as evident, the fuel head around the manifold 1 will vary as the function of $P \mp h/2 (\sin \phi)$ where "$h$" is the difference in head between the uppermost portion and the lowermost portion of the manifold and wherein "$\phi$" is the angular disposition of the respective valves 3 and nozzles 4 with reference to the horizontal center line.

When the direction of movement of the valve operating parts in the respective valves 3 is radially in a plane normal to the manifold 1 axis, the radial component of the mass (in poundals) multiplied by the acceleration due to gravity and divided by the area of the valve seat should equal $h/2 (\sin \phi)$ with the mass component acting to unseat the valve member when the valve member is disposed above the horizontal center line of the manifold 1 and to seat the valve member when the valve is mounted below the horizontal center line of the manifold 1. When the angle $\phi$ is zero at the sides of the manifold, the radial component of the mass of the operating parts is zero and therefore the valve member will be actuated by pressure P thereat and by reason of the balancing or compensating action just mentioned, all of the valves 3 around the manifold will be actuated to the same metering positions according to change in pressure P, since the differences in pressure due to head or different elevations relative to the horizontal center line is compensated for by the respective valves 3.

Figure 3:
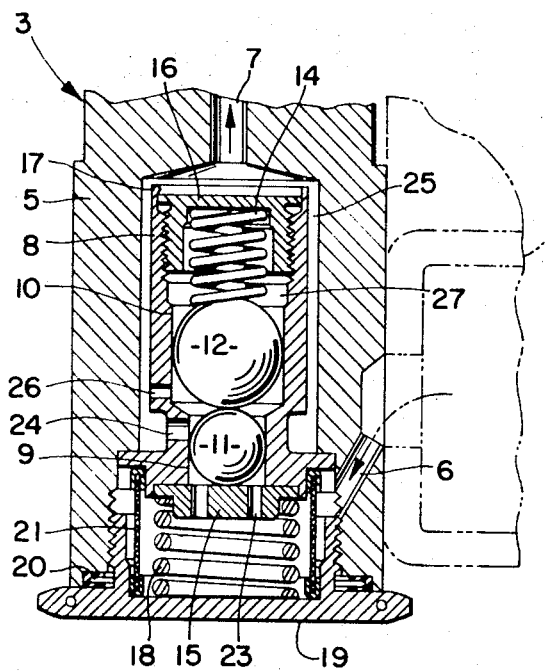
FIGS. 3 and 4 are enlarged cross-section views of valves embodying the present invention, the valves of FIGS. 3 and 4 being, for example, those which are located at the bottom of the manifold wherein the mass of the operating parts acts downwardly to compensate for the increased fuel head at the bottom of the manifold as compared with the fuel head at the horizontal center line.

Referring now to FIG. 3, the fuel head compensating valve 3 shown therein comprises a body or housing 5 having a fuel inlet passage 6 communicated with the manifold 1 and a fuel outlet passage 7 communicated with the associated fuel sprayer nozzle 4.

Within housing 5 is a valve guide member 8 having at one end a bore 9 and at the other end a larger bore 10. A ball 11 preferably made of hard metal is made to be a close fit in the smaller bore 9 but with sufficient clearance that the ball 11 will roll rather than slide. A larger ball 12 is movable in the larger bore 10 with significantly larger clearance than the smaller ball 11 in bore 9. A spring 14 loads the two balls 12 and 11 together against a spider 15 which is brazed or otherwise secured to the guide member 8. The spring 14 abuts a cap 16 threaded into the member 8 to form an adjustment for the spring 14 load, the cap 16 being locked rotationally to the body by conventional means such as by staking at 17. The valve assembly thus constituted is thus held in a housing 5 by means of spring 18 bearing against a threaded cap 19 sealed by a seal 20.

Fuel enters the housing 5 through the inlet passage 6 from the manifold 1 and passes through a filter screen 21 and enters the valve guide bore 9 through holes 23 in the spider 15. The fuel inlet pressure acts on the cross-section area of the ball 11 against the mass of both balls 11 and 12 and the force of the spring 14 to move the ball 11 along the bore 9 which has a metering slot 24 through which the fuel flows into the space 25 between the guide member 8 and housing 5 eventually passing out of the exit passage 7 for flow through the associated fuel spray nozzle 4. The space between the balls 11 and 12 may be vented by a hole 26 and the space 27 above the ball 12 is closed except for the restricted flow path between ball 12 and bore 10, and therefore, said ball 12 functions as a fluid damping member to eliminate undesirable oscillations of the valve operating parts 11 and 12. The metering slot 24 may be arranged so that the ball 11 is in the position shown in FIG. 3, that is, held against the spider 15. The leading (lower) edge of the slot 24 is above the horizontal diameter of the ball 11 and is thus effectively closed off. Alternatively, if desired, the leading edge may be below this point so that a small flow path is open at all times. In either case, the movement of the ball 11 will act to vary the slot 24 area and thus meter the fuel in desired manner.

The valve 3 shown in FIG. 3 is the bottom one which is shown in FIGS. 1 and 2 and therefore, the mass of the valve operating parts 11 and 12 including spring 14 will be equal to $h/2$ multiplied by the area of the valve seat, i.e., the diameter of the ball 11 and bore 9. Thus, the balls 11 and 12 will be moved upwardly when the pressure P which the pressure at the horizontal center line of the manifold 1 exceeds the pressure exerted by the spring 14 on the balls 11 and 12. The distance that the ball 11 moves upwardly will depend on the magnitude of the pressure P acting on the projected area of ball 11, thus to meter the flow of fuel to the nozzle 4. As evident, the fuel head at the top of the manifold 1 will be $P - h/2$ but when the valve 3 of FIG. 3 is inverted, the mass of the operating parts 11 and 12 act downwardly with a force which is equivalent to $h/2$ times the area of the valve seat so that the upper valve 3 will also be unseated by pressure P since the decreased head at the top of the manifold is compensated for or balanced by the unseating tendency of the mass of the operating parts 11 and 12. The same applies to the other valves 3 at all angular positions since the effect of the mass acting to unseat or to seat the valve operating parts 11 and 12 varies according to the variation in head, that is, + or − $h/2 (\sin \phi)$.

As now apparent, identical valves 3 may be used for all positions of the same around the manifold 1 and they will automatically compensate for the head difference around the manifold 1 provided they are installed essentially radially in a plane normal to the engine axis. The valves 3 would normally be preset to a constant unseating pressure with all the valves 3 installed in an identical manner for test purposes. For example, all valves 3 could be preset in a horizontal position.

It will be readily understood that it is not essential that the valve 3 axis be both radial and in a plane normal to the engine axis, but instead the valve 3 axes may be arranged to be the slant height elements of a right circular cone. In this case, the effective mass of the valve operating parts 11 and 12 is reduced by the factor $(\sin \phi)(\sin a)$ where "$a$" is half the apex angle of the cone. $(\sin a)$ will, however, be constant and the valves 3 will automatically balance the effective head at every position as before.

It will be noted that the effective force produced by the mass of the valve operating parts 11 and 12 depends on the acceleration of gravity "$g$". In the case of an engine mounted in an airplane, for example, it is possible that the motion of the airplane when turning or maneuvering, will subject the entire engine and fuel manifold 1 to radial acceleration forces in excess of 1 g. which will result in a greater effective weight of the valve operating parts 11 and 12. This effect will, however, be exactly balanced by an increase in the effective head of the liquid fuel which is also subjected to the same acceleration referred to the engine axis.

In the preceding discussion no account was taken of the effects of friction in the valve moving parts 11 and 12. With conventional pistons sliding in bores or valve stems sliding in guides, the friction force will act to reduce the effective mass of the valve parts in a generally unpredictable manner. This is particularly likely when the valves are installed in other than vertical positions. Furthermore, the operating requirements will usually dictate that the valves function with relatively low pressure differences which implies small operating forces. Thus, it is impossible to ignore or neglect the friction forces when accurate and constant behavior of the valve is desired. The valve 3 herein described solves the problems stated in a novel manner, whereby sliding friction of the moving parts 11 and 12 is practically eliminated and the effective mass of the valve parts 11 and 12 can be very closely controlled.

Figure 4:
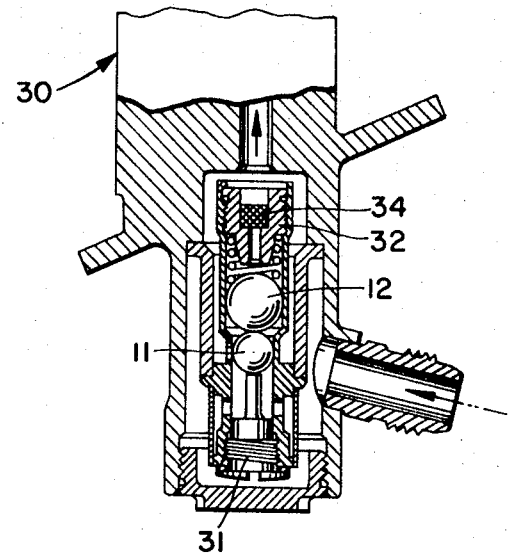

In the FIG. 4 valve 30 an adjustable stop 31 replaces the fixed spider 15 and the spring abutment 32 carries a restrictor element 34 which may, for example, be of porous sintered metal to control the damping characteristics of the valve parts 11 and 12.

Although the characteristics of this invention as herein disclosed are particularly suited to solve the problem of compensating for fuel head differences in a circular manifold 1, it should be noted that the valves 3 or 30 could be used in any situation requiring compensation for head difference either by employing valves of identical size installed at different angles, or by using valves 3 or 30 of different masses of the operating parts 11 and 12 or different effective areas. Furthermore, such valves 3 or 30 are of general usefulness whenever it is desired to eliminate the effects of friction or varying mass in conventional valves. The balls 11 and 12 herein used are commercially available and are made to precise tolerances within very close limits such that the masses thereof are very closely controlled as compared with manufactured valve parts which entail precision manufacture from bar stock since ordinary drilling and turning operations involve tolerances which would cause too great a mass variation and thus expensive time consuming operations such as grinding and precision finishing may be required to achieve close mass control.

I, therefore, particularly point out and distinctly claim as my invention:

1. A flow metering valve comprising a housing having an inlet and an outlet; a guide member in said housing having a bore and a coaxial counterbore with the former communicating with said inlet, and a metering slot intersecting said bore and communicating with said outlet whereby fluid may flow through said housing from said inlet to said outlet via said bore and metering slot; a first ball of substantially the same diameter as said bore movable in opposite directions therein to increase or decrease the flow area of said metering slot; stop means adjacent to said bore engaged by said first ball determining the minimum flow area of said metering slot while the entire projected area of said first ball is exposed to fluid pressure in said inlet tending to move said first ball in a direction to increase such flow area; and adjustable plug member in said guide member adjacent to said counterbore; a second ball of substantially the same diameter as said counterbore movable in opposite directions therein; spring means in said guide member compressed between said plug member and said second ball to urge said second ball into contact with said first ball thereby biasing the latter in one direction toward said stop means to decrease the flow area of said metering slot as the fluid pressure in said inlet decreases, said spring means permitting yielding movement of said balls while in contact with each other in the other direction to increase the flow area of said metering slot as the fluid pressure in said inlet increases; said guide member, plug member, and second ball defining a dashpot for dampening the movements of said balls in opposite directions in said bore and counterbore.

2. The valve of claim 1 wherein said metering slot is communicated with said outlet via a space around said guide member and a space between the plug member end of said guide member and said housing.

* * * * *